G. H. & G. A. FROGGATT.
SCALE.
APPLICATION FILED JUNE 29, 1915.

1,184,939.

Patented May 30, 1916.
2 SHEETS—SHEET 1.

Inventors
GEORGE H. FROGGATT
GEORGE A. FROGGATT

By Shigley & Harvey
Attorneys

G. H. & G. A. FROGGATT.
SCALE.
APPLICATION FILED JUNE 29, 1915.

1,184,939.

Patented May 30, 1916.
2 SHEETS—SHEET 2.

Inventors
GEORGE H. FROGGATT
GEORGE A. FROGGATT

By Shigley & Harney
Attorneys

UNITED STATES PATENT OFFICE.

GEORGE H. FROGGATT AND GEORGE A. FROGGATT, OF COLUMBUS, OHIO.

SCALE.

1,184,939.  Specification of Letters Patent.  Patented May 30, 1916.

Application filed June 29, 1915. Serial No. 37,010.

*To all whom it may concern:*

Be it known that we, GEORGE H. FROGGATT and GEORGE A. FROGGATT, citizens of the United States of America, residing at Columbus, in the county of Franklin and State of Ohio, have invented certain new and useful Improvements in Scales, of which the following is a specification.

Our present invention appertains to improvements in scales, and is directed particularly to the dial and indicating mechanism of the scales.

In the exemplification of the invention we have shown our invention in connection with the beam type of scales, but this is merely for convenience of illustration, and it will be apparent that the dial and indicating devices may be utilized in connection with other types of scales or measuring instruments.

The primary object of the invention is the provision of a compactly arranged, sensitive, but durable and comparatively inexpensive mechanism for indicating the load upon the scales, that is simple both in construction and operation, and not likely to become deranged.

The invention consists in certain novel combinations and arrangements of parts of the indicating mechanism as will be hereinafter more fully explained.

In the accompanying drawings we have illustrated the invention in connection with a beam scale to show the best form we have so far devised for the practical application of the principles of our invention.

Figure 1:
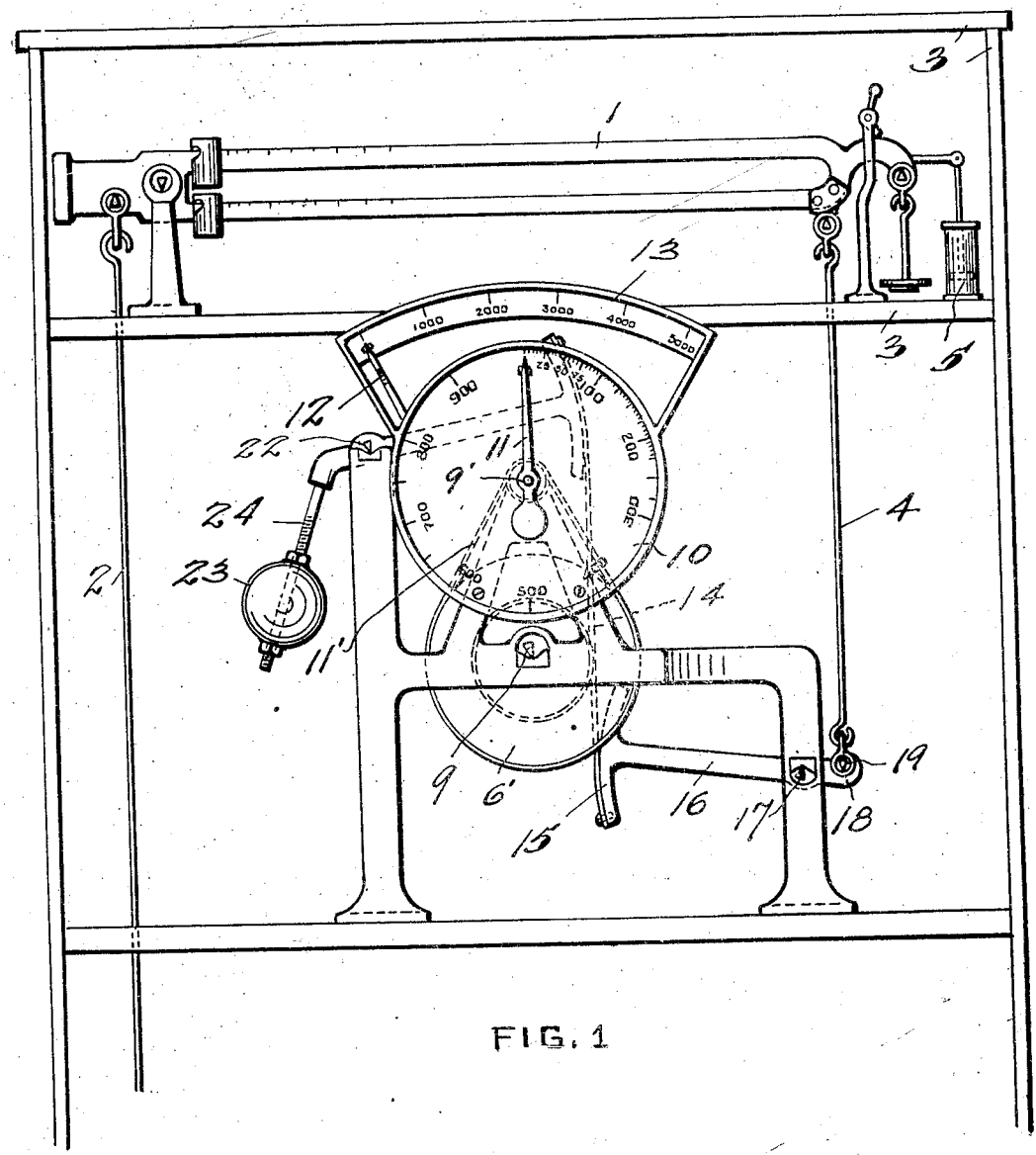
Figures 2, 3:
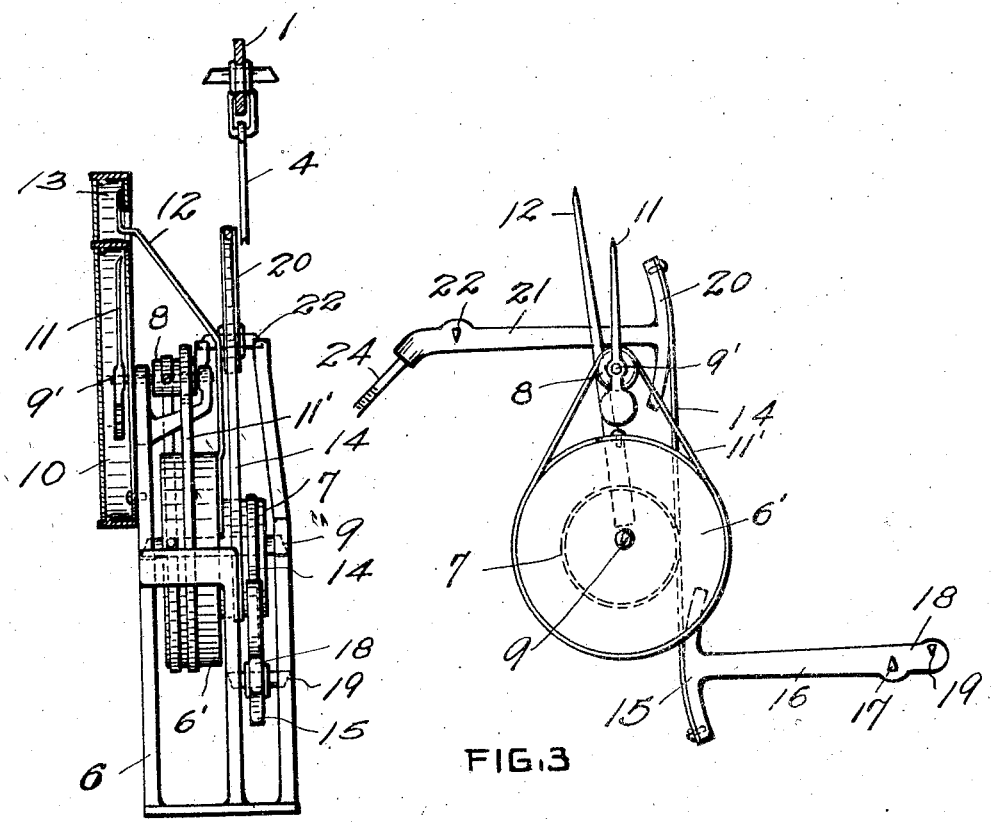
Figure 4:
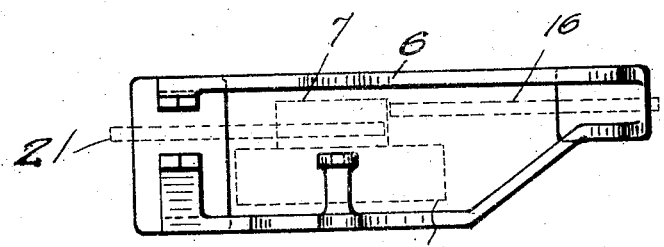

Figure 1 is a front elevation of the actuating and indicating mechanism, (the usual casing being omitted) showing it in operative relationship with a beam scale. Fig. 2 is a side elevation of Fig. 1, partly in section, and parts omitted, in order to more clearly show the parts. Fig. 3 is a front elevation of the mechanism the dial and scale parts omitted, the pointer or hand indicating a load of 2000 pounds. Fig. 4 is a top plan view of the supporting frame, with operating parts shown in dotted lines.

We have illustrated as much of a typical beam scale as is necessary for a proper understanding of the operation of our invention and this beam scale includes the pivoted beam 1, the pivoted draw rod 2, the supporting frame 3, the pivoted connecting rod 4 and preferably a dash pot 5 of any suitable type which we deem desirable in some instances to prevent excessive or prolonged vibration of the indicating mechanism.

The device of our invention is supported upon a cast metal frame 6 and consists of three revoluble drums as 6′, 7, 8, the large drum, 6′ and intermediate drum 7, however, being only oscillated, and for this purpose they are supported upon knife edge bearings 9 in the frame 6. It should be understood that the drum 8 is shown as exaggerated in size for the sake of clearness, while in actual use the ratio of the diameters of drums 6′ and 8 is about forty to one. The smallest drum 8 is rotatably supported upon the needle shaft 9′ which is journaled in the frame 6 and projects through a central opening in the dial or scale disk 10 which is fixed by screws or other means to the front of the frame 6. This shaft carries the needle 11 which is fixed on the shaft and revolves with it to co-act with the circular scale arranged on the scale disk, from 0 to 1000 pounds. The largest drum 6′ is adapted to revolve the smaller drum 8 through the medium of a flexible band or belt 11′ which is suitably wound around both drums with an end attached to each, so that when the large drum oscillates through an arc of about 45° it will, through its belt revolve the smallest drum five times. In this manner the hand or pointer 12 on the drum 6′ is made to indicate a weight of 5000 lbs. on the curved scale 13 while the revoluble needle 11 is caused to revolve five times to indicate the same weight on the disk scale. The drum 7 is the driving device for the indicating mechanism, and this is operated or oscillated by means of a flexible belt or metallic band 14, similar to the band 11′, which is wound once around the drum with one end attached to the curved head 15 of an operating lever 16 pivoted with a knife edge bearing 17 in the frame 6. The short arm 18 of this lever is connected by the knife edge bearing 19 to the connecting rod 4 as best seen in Fig. 1. The other end of the band is attached to the curved head 20 of a return lever 21 which is pivoted at 22 in the frame and has a counterweight 23 adjustable on the threaded end 24 of this lever.

The actuation and operation of the parts will be readily apparent. When the load on the platform pulls down on the draw rod 2 the right end of the beam lifts the connecting rod 4 which causes the long arm of the lever 16 to descend which partially revolves the drums 7 and 6' through the medium of the band 14 and raises the weight 23 as understood. This partial revolution of the drums swings the hand or pointer 12 to indicate the weight on the scale 13, and at the same time the oscillation or partial rotation of the drums, through the medium of the band 11' which is engaging its drums, causes the rotation of the smallest drum 8 and consequent rotation of the needle 11 therewith to indicate the weight on the scale on the disk dial 10. When the load is displaced from the platform, the counterweight 23 returns the parts to normal position. The dash pot 5 is preferably used in order to steady and prevent excessive or prolonged vibration of the two indicating devices, the needle and pointer, and it aids in bringing the parts to rest quickly when once the load is made to operate the device.

It will be readily apparent that this device may be attached to either new scales, or old existing scales may be equipped with our indicating mechanism without great labor or change to the working parts of the scales. Metallic belts 11' and 14 may be of various materials, to be determined with relation to their expansion and contraction under differing conditions. It is also evident that the operating lever 16 may be actuated from any other suitable part of the scale beam or moving part of the scale mechanism, but these apparent changes are all contemplated, and within the scope of our appended claims.

What we claim is:—

1. The combination with a movable scale beam, of an oscillatable drum, a pointer actuated therewith, and a scale for the pointer, an operating lever connected to the beam, a return lever with a weight attached, and a flexible band connecting said levers and passed around the oscillatable drum.

2. The combination with a movable scale beam of an oscillatable drum, a pointer actuated therewith and a reading scale for said pointer, an operating lever, a return weighted lever, and a flexible band connecting said levers and drum, a rotary drum carrying a needle, a circular reading scale for said needle, and a flexible band operatively connecting said rotary drum and oscillatable drum.

In testimony whereof we affix our signatures.

GEORGE H. FROGGATT.
GEORGE A. FROGGATT.